US010015786B2

(12) United States Patent
Lee et al.

(10) Patent No.: US 10,015,786 B2
(45) Date of Patent: *Jul. 3, 2018

(54) TECHNIQUE FOR TRANSMITTING AND RECEIVING DOWNLINK REFERENCE SIGNALS

(71) Applicant: LG ELECTRONICS INC., Seoul (KR)

(72) Inventors: Moon Il Lee, Gyeonggi-do (KR); Wook Bong Lee, Gyeonggi-do (KR); Jae Hoon Chung, Gyeonggi-do (KR); Hyun Soo Ko, Gyeonggi-do (KR); Bin Chul Ihm, Gyeonggi-do (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/716,051

(22) Filed: Sep. 26, 2017

(65) Prior Publication Data

US 2018/0020433 A1 Jan. 18, 2018

Related U.S. Application Data

(63) Continuation of application No. 14/852,807, filed on Sep. 14, 2015, now Pat. No. 9,794,924, which is a (Continued)

(30) Foreign Application Priority Data

Jan. 6, 2010 (KR) ........................ 10-2010-0000820

(51) Int. Cl.
*H04B 7/06* (2006.01)
*H04W 72/04* (2009.01)
(Continued)

(52) U.S. Cl.
CPC ........ *H04W 72/042* (2013.01); *H04B 7/0452* (2013.01); *H04J 11/0026* (2013.01);
(Continued)

(58) Field of Classification Search
None
See application file for complete search history.

(56) References Cited

U.S. PATENT DOCUMENTS

2007/0248113 A1 10/2007 Ko et al.
2007/0258540 A1 11/2007 Ratasuk et al.
(Continued)

FOREIGN PATENT DOCUMENTS

CA 2692109 12/2008
CN 1897757 1/2007
(Continued)

OTHER PUBLICATIONS

The State Intellectual Property Office of the People's Republic of China Application Serial No. 201080004817.6, Office Action dated Jul. 3, 2013, 5 pages.
(Continued)

*Primary Examiner* — Hassan Phillips
*Assistant Examiner* — Ayanah George
(74) *Attorney, Agent, or Firm* — Lee Hong Degerman Kang Waimey (57) ABSTRACT

A technique for receiving and transmitting downlink reference signals is disclosed. When transmitting downlink data demodulation reference signals (DMRS) (or reference signals for downlink data demodulation) by using two or more layers, the DMRS of each layer may be multiplexed by using a code division multiplexing method and then transmitted. The DMRS for each of the two or more layers may be used for one user equipment or for two or more user equipments. And, downlink control signals for transmitting and receiving
(Continued)

such DMRS may be configured to have the same format regardless of a single-user mode (or SU-MIMO mode) or a multi-user mode (or MU-MIMO mode), thereby being used.

12 Claims, 6 Drawing Sheets

Related U.S. Application Data continuation of application No. 12/698,869, filed on Feb. 2, 2010, now Pat. No. 9,178,639.

(60) Provisional application No. 61/180,657, filed on May 22, 2009, provisional application No. 61/179,383, filed on May 19, 2009, provisional application No. 61/179,022, filed on May 18, 2009, provisional application No. 61/149,652, filed on Feb. 3, 2009.

(51) Int. Cl.
*H04B 7/0452* (2017.01)
*H04L 25/03* (2006.01)
*H04L 5/00* (2006.01)
*H04J 11/00* (2006.01)
*H04W 88/08* (2009.01)
*H04W 52/32* (2009.01)
*H04W 52/14* (2009.01)
*H04B 7/0413* (2017.01)

(52) U.S. Cl.
CPC .......... *H04L 5/0023* (2013.01); *H04L 5/0048* (2013.01); *H04L 25/03343* (2013.01); *H04B 7/0413* (2013.01); *H04W 52/143* (2013.01); *H04W 52/325* (2013.01); *H04W 88/08* (2013.01)

(56) References Cited

U.S. PATENT DOCUMENTS

| | | | |
|---|---|---|---|
| 2008/0200196 A1 | 8/2008 | Muharemovic et al. | |
| 2008/0212701 A1 | 9/2008 | Pan et al. | |
| 2008/0260062 A1 | 10/2008 | Imamura | |
| 2008/0273452 A1* | 11/2008 | Khan | H04B 7/0669 370/203 |
| 2010/0118772 A1 | 5/2010 | Cheng et al. | |
| 2010/0195599 A1* | 8/2010 | Zhang | H04L 5/0053 370/329 |
| 2011/0103338 A1 | 5/2011 | Astely et al. | |
| 2012/0087327 A1 | 4/2012 | Ratasuk et al. | |
| 2016/0007328 A1 | 1/2016 | Lee et al. | |

FOREIGN PATENT DOCUMENTS

| | | |
|---|---|---|
| CN | 101335969 | 12/2008 |
| KR | 10-2008-0054164 | 6/2008 |
| WO | 2007117127 | 10/2007 |
| WO | 08/114743 | 9/2008 |
| WO | 2008136459 | 11/2008 |
| WO | 2009002251 | 12/2008 |

OTHER PUBLICATIONS

Taiwan Intellectual Property Office Application Serial No. 099103214, Office Action dated Jan. 30, 2013, 6 pages.
LG Electronics, "Downlink Reference Signal for Higher Order MIMO," 3GPP TSG RAN WG1 Meeting #55bis, R1-090218, Jan. 2009, 7 pages.
CMCC, et al., "CQI report for transmission mode 7," 3GPP TSG RAN WG1 meeting #55, R1-084329, Nov. 2008, 16 pages.
NEC, et al., "Way forward on DL power control," RAN WG1 meeting 50Bis, R1-074158, Oct. 2007, 2 pages.
Catt, "Dual Ports DRS Design for BF", 3GPP TSG RAN WG1 Meeting #55bis, R1-090185, Jan. 2009, 7 pages.
LG Electronics, "Consideration on DM-RS Design for LTE-Advanced", 3GPP TSG RAN WG1 Meeting #57, R1-092109, May 2009, 3 pages.
Huawei, "LTE-A Downlink DM-RS Pattern Design", 3GPP TSG RAN WG1 Meeting #57, R1-092217, May 2009, 10 pages.
European Patent Office Application Serial No. 10738726.8, Search Report dated Sep. 28, 2017, 13 pages.

* cited by examiner

Antenna port 5

FIG. 5

PS-6, CDM, 12RS

FIG. 6

TECHNIQUE FOR TRANSMITTING AND RECEIVING DOWNLINK REFERENCE SIGNALS

CROSS REFERENCE TO RELATED APPLICATIONS

This application is a continuation of U.S. patent application Ser. No. 14/852,807, filed on Sep. 14, 2015, now U.S. Pat. No. 9,794,924, which is a continuation of U.S. patent application Ser. No. 12/698,869, filed on Feb. 2, 2010, now U.S. Pat. No. 9,178,639, which claims the benefit of earlier filing date and right of priority to Korean Patent Application No. 10-2010-0000820, filed on Jan. 6, 2010, and also claims the benefit of U.S. Provisional Application Nos. 61/149,652, filed on Feb. 3, 2009, 61/179,022, filed on May 18, 2009, 61/179,383, filed on May 19, 2009, and 61/180,657, filed on May 22, 2009, the contents of which are all hereby incorporated by reference herein in their entirety.

BACKGROUND OF THE INVENTION

Field of the Invention

The present invention relates to a mobile telecommunications technology, and more particularly, to a technique for receiving and transmitting downlink reference signals. Herein, downlink reference signals for data demodulation are efficiently received and transmitted in a single user mode or a multi-user mode.

Discussion of the Related Art

In a mobile telecommunications system, a user equipment (UE) may receive information from a base station through a downlink, and the UE may also transmit information through an uplink. Information transmitted or received by the UE may include data and diverse control information. And, depending upon the type and usage of the information transmitted or received by the UE, a variety of physical channels may exist.

Figure 1:
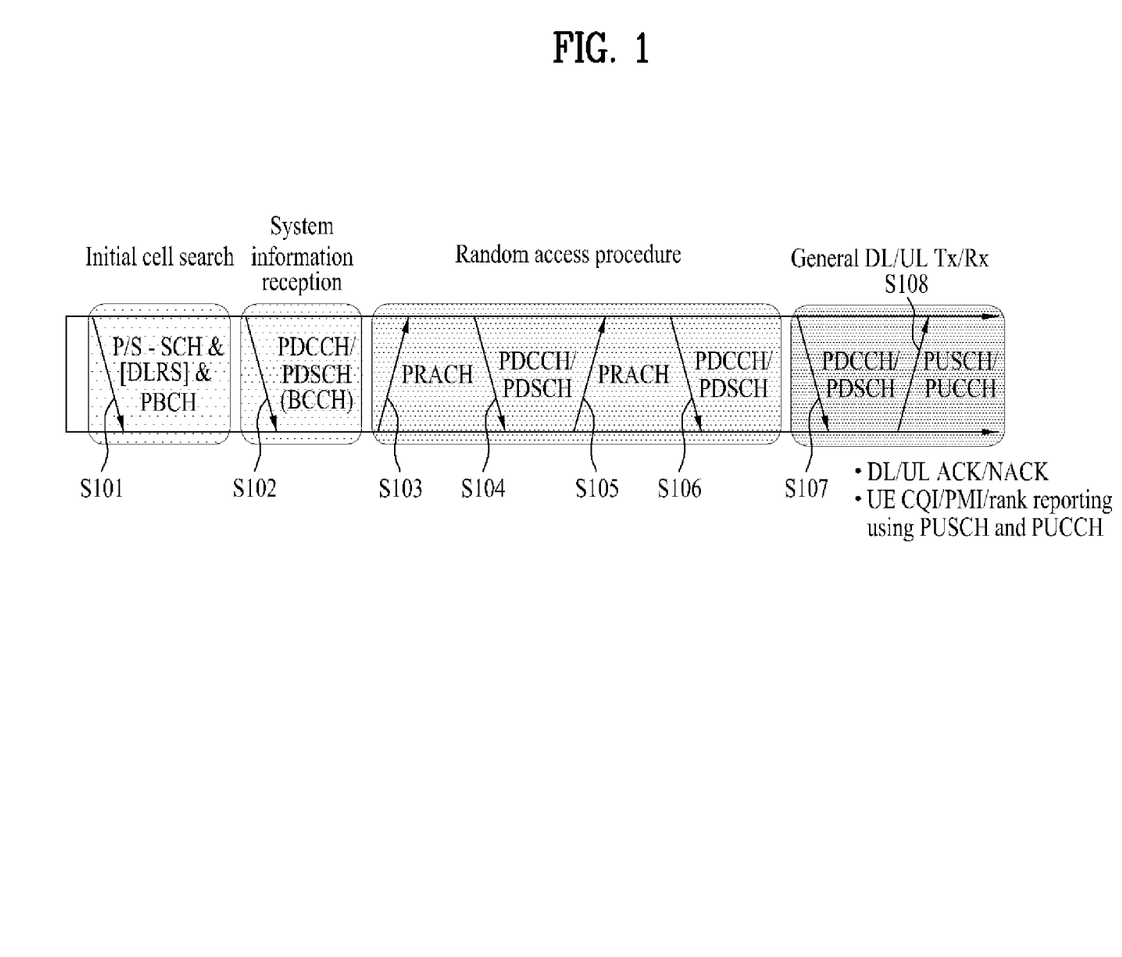
FIG. 1 illustrates a general view showing the physical channels used in a mobile telecommunications system, such as a 3rd generation partnership project (3GPP) long term evolution (LTE) system and a general method for transmitting signals.

FIG. 1 illustrates a general view showing the physical channels used in a mobile telecommunications system, such as a 3rd generation partnership project (3GPP) long term evolution (LTE) system and a general method for transmitting signals. When power of a UE is turned off and then turned back on, or when using a UE newly introduced to a cell, in step 101, the UE performs an initial cell search process in order to be in synchronization with the base station. In order to do so, the UE receives a primary synchronization channel (P-SCH) and a secondary synchronization channel (S-SCH) from the base station, so as to be in synchronization with the base station, thereby being able to acquire information such as cell ID. Thereafter, the UE receives a physical broadcast channel from the base station, thereby being capable of acquiring broadcast information within the cell. Meanwhile, during an initial cell searching step, the UE receives a downlink reference signal (DL RS), thereby being able to verify the downlink (DL) channel status. After completing the initial cell search, in step 102, the UE may receive a physical downlink control channel (PDCCH) and a physical downlink shared channel (PDSCH) based upon the physical downlink control channel information, so as to acquire more detailed system information.

Meanwhile, in case the UE has not completed its access to the base station, the UE may perform a random access procedure, as shown in step 103 to step 106, in a later process in order to complete its access to the base station. For this, the UE transmits a characteristic sequence as a preamble through a physical random access channel (PRACH) (S103). Then, the UE may receive a response message respective to the random access through the physical downlink control channel (PDCCH) and its corresponding physical downlink shared channel (PDSCH) (S104). Subsequently, with the exception of a handover, in case of a contention-based random access, the UE may perform a contention resolution procedure, such as transmitting additional physical random access channels (PRACHs) (S105) and receiving the respective physical downlink shared channels (PDSCHs) (S106). After performing the above-described procedure, the UE may receive physical downlink control channel (PDCCH)/physical downlink shared channel (PDSCH) (S107) and may transmit physical uplink shared channel (PUSCH)/physical uplink control channel (PUCCH) (S108), as a general uplink/downlink (UL/DL) signal transmission procedure.

Figure 2:
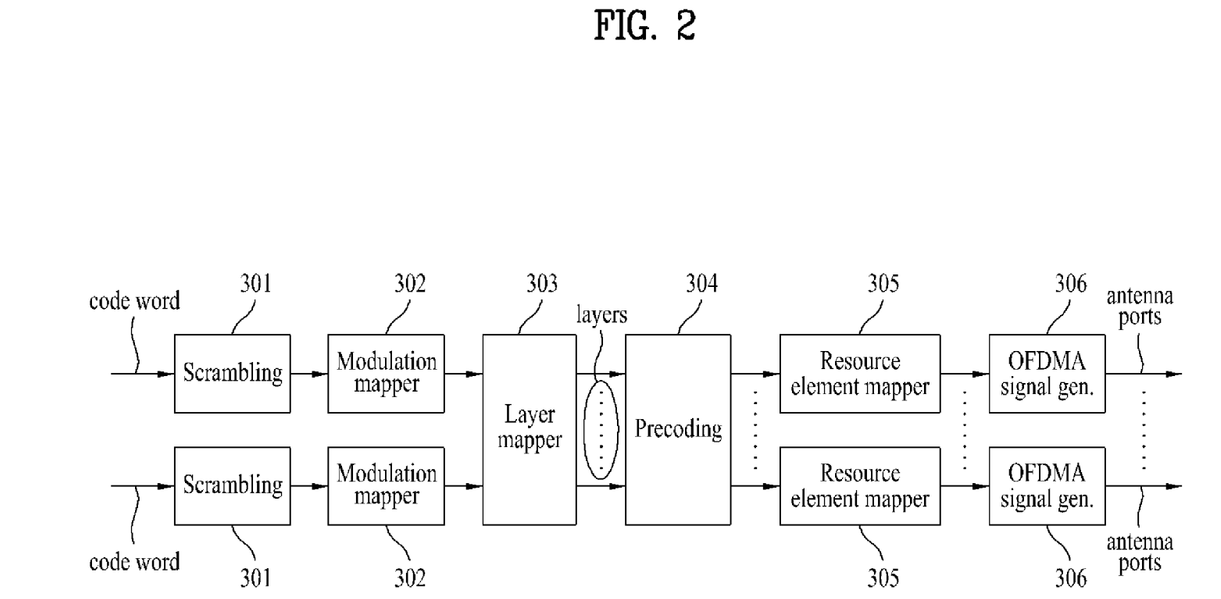
FIG. 2 illustrates a block view showing a signal processing procedure for transmitting a downlink signal from a base station.

FIG. 2 illustrates a block view showing a signal processing procedure for transmitting a downlink signal from a base station. In the 3GPP LTE system, the base station may transmit at least one or more code words via downlink. Each of the at least one or more code words may be processed through a scrambling module 301 and a modulation mapper 302 as a complex symbol. Thereafter, the complex symbol is mapped to multiple layers by a layer mapper 303. Herein, a precoding module 304 multiplies each layer by a selected precoding matrix depending upon the channel status, thereby allocating (or assigning) the processed layers to each transmission antenna. Each transmission signal processed as described above for the respective antenna is mapped to a time-frequency resource element, which is to be used by a resource element mapper 305 for transmission. Subsequently, each of the transmission signals passes through an OFDM signal generator 306 so as to be transmitted through the respective antenna.

Hereinafter, a downlink reference signal that is used in the 3GPP LTE system will be described in detail. The 3GPP LTE system uses antenna number 0 to antenna number 5 as its logical antenna ports. Herein, each antenna port is not divided (or classified) by a physical division (or classification). Therefore, the question of mapping each logical antenna index to which actual physical antenna index would relate to the implementation by each manufacturer.

In the 3GPP LTE system, three different types of reference signals are used as downlink reference signals. The three types include cell-specific reference signals (non-associated with MBSFN transmission), MBSFN reference signals associated with MBSFN transmission, and UE-specific reference signals. A cell-specific reference signal corresponds to a reference signal generated by using a cell ID for each cell as an initial value. Herein, antenna port 0 to antenna port 3 may be used for transmitting the cell-specific reference signals. An MBSFN reference signal is used for acquiring downlink channel information respective to the MBSFN transmission. Herein, antenna port 4 may be used for transmitting the MBSFN reference signal. Meanwhile, in the 3GPP LTE system, a UE-specific reference signal is supported for a single antenna port transmission of the PDSCH. Herein, antenna port 5 may be used for transmitting the UE-specific reference signal. The UE may receive from an upper layer (or higher layer) (e.g., a MAC layer or higher) information on whether such user-specific reference signals exist so as to be used for PDSCH demodulation.

Figure 3:
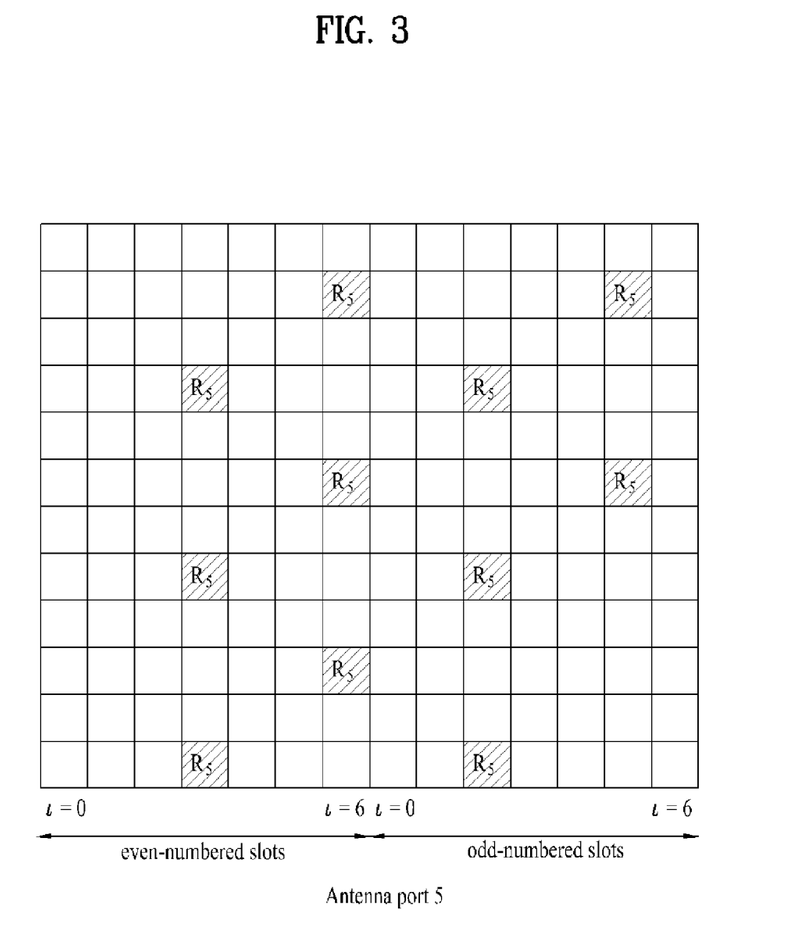
FIG. 3 illustrates an example of a specific reference signal being mapped in a time-frequency resource region and transmitted, when the 3GPP LTE system uses a general cyclic prefix.

FIG. 3 illustrates an example of a specific reference signal being mapped in a time-frequency resource region and transmitted, when the 3GPP LTE system uses a general cyclic prefix. Referring to FIG. 3, the horizontal axis represents a time region, and the vertical axis represents a frequency region. In the time-frequency region shown in FIG. 3, the smallest squared region corresponds to 1 OFDM symbol in the time region and to 1 subcarrier in the frequency region. In the 3GPP LTE system, when a normal cyclic prefix (CP) is used, one slot includes 7 OFDM symbols, and one sub-frame includes 2 slots. FIG. 3 illustrates a pattern where a UE-specific reference signal being transmitted through antenna port 5 is mapped to the time-frequency region throughout even-numbered slots and odd-numbered slots, thereby being transmitted.

SUMMARY OF THE INVENTION

Accordingly, the present invention is directed to a technique for receiving and transmitting downlink reference signals that substantially obviates one or more problems due to limitations and disadvantages of the related art.

An object of the present invention is to provide a technique for receiving and transmitting downlink reference signals that can be extended so as to transmit a user-specific reference signal of the 3GPP LTE system by using two or more layers in a $3^{rd}$ generation partnership project long term evolution-advanced (3GPP LTE-A) system, which is an evolved model of the 3GPP LTE system.

Another object of the present invention is to provide a technique for receiving and transmitting downlink reference signals that can transmit user-specific reference signals through two or more layers, the user-specific reference signals being supported only in signal antenna transmissions for the conventional PDSCH.

A further object of the present invention is to provide a technique for receiving and transmitting downlink reference signals that can enable a single user transmission mode/multiple (or multi) user transmission mode to be efficiently supported by using user-specific downlink reference signals, which are transmitted through two or more layers, and that can multiplex and transmit two or more user-specific downlink reference signals, which are transmitted through two or more layers.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a method of transmitting downlink reference signals using two or more layers from a base station, the method includes multiplexing two or more downlink reference signals being transmitted by respectively using two or more layers for downlink data signal demodulation in a pre-determined time-frequency region using a code division multiplexing (CDM) method, and transmitting the multiplexed signals to one or more user equipments in a single-user transmission mode or a multi-user transmission mode, and transmitting downlink control signals to the at least one user equipment, the downlink control signals indicating a downlink transmission method for each of the at least one user equipment. Herein, the downlink control signals may have identical formats regardless of whether or not the downlink reference signal transmission for each of the at least one user equipment is performed in the single-user transmission mode or in the multi-user transmission mode.

At this point, the method of transmitting downlink reference signals using two or more layers from a base station may further include transmitting the downlink data signals to the at least one user equipment in the single-user transmission mode or in the multi-user transmission mode by using the two or more layers. Herein, the downlink data signals and the downlink reference signals may be processed with the same precoding procedure, thereby being transmitted to the at least one user equipment. Also, the downlink control signals may include information on number of layers being assigned to each user equipment and information specifying layers used in each user equipment.

Meanwhile, when the number N of layers being used in the downlink reference signal transmission is greater than M (wherein N corresponds to a number of downlink reference signals that can be multiplexed in the pre-determined time-frequency region by using a code division multiplexing method), each of the N number of downlink reference signals may be multiplexed within the pre-determined time-frequency region and additional time-frequency region. Also, a multiplexing procedure using time division multiplexing (TDN) or frequency division multiplexing (FDM) may be performed throughout the pre-determined time-frequency region and additional time-frequency region for each of the N number of downlink reference signals being multiplexed within the pre-determined time-frequency region and additional time-frequency region.

Additionally, when two or more user equipments receive the M number of downlink reference signals, the downlink control signal being transmitted to a first user equipment, which receives downlink reference signals transmitted through the pre-determined time-frequency region, may include information indicating that the additional time-frequency region is used for transmitting downlink reference signals to a second user equipment. Meanwhile, transmission power of each of the two or more downlink reference signals may be different from one another. Herein, the downlink control signal may further include transmission power information for the two or more downlink reference signals.

In another aspect of the present invention, in a method of receiving downlink reference signals in a user equipment by using two or more layers from a base station, the method includes receiving downlink reference signals multiplexed by using a code division multiplexing (CDM) method in a pre-determined time-frequency region for downlink data signal demodulation from the base station, and receiving downlink control signals indicating a downlink transmission method for the user equipment. Herein, the downlink control signals may have identical formats regardless of whether or not the downlink reference signals, which are multiplexed by using a code division multiplexing (CDM) method in a pre-determined time-frequency region, include downlink reference signals that are transmitted to the user equipment as well as another user equipment.

In another aspect of the present invention, in a base station transmitting downlink reference signals by using two or more layers, the base station includes a processor providing downlink reference signals, which are multiplexed by using a code division multiplexing (CDM) method in a pre-determined time-frequency region, wherein two or more downlink reference signals are to be respectively transmitted by using the two or more layers for downlink data signal demodulation, and downlink control signals indicating a downlink transmission method for each of one or more user equipments, and a transmitting module transmitting the two or more downlink reference signals and the downlink control signals received from the processor to one or more user equipments in a single-user transmission mode or in a multi-user transmission mode. Herein, the processor may provide the downlink control signals in identical formats regardless of whether the single-user transmission mode or the multi-user transmission mode is being applied.

In a further aspect of the present invention, in a user equipment receiving downlink reference signals being transmitted from a base station by using two or more layers, the user equipment includes a receiving module receiving downlink reference signals multiplexed by using a code division multiplexing (CDM) method in a pre-determined time-frequency region for downlink data signal demodulation from the base station, and receiving downlink control signals indicating a downlink transmission method for the user equipment, and a processor processing the downlink reference signals in accordance with information on the downlink control signals. Herein, the downlink control signals may have identical formats regardless of whether or not the downlink reference signals, which are multiplexed by using a code division multiplexing (CDM) method in a pre-determined time-frequency region, include downlink reference signals that are transmitted to the user equipment as well as another user equipment.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. It should be understood that the present invention is not limited solely to the following embodiment. The following description includes specific details for providing a full understanding of the present invention. However, it is apparent to anyone skilled in the art that the present invention may also be embodied without such specific details.

In some cases, to avoid any ambiguity in the concept of the present invention, structures or devices of the disclosure may be omitted, or the embodiment of the present invention may be illustrated in the form of block views focusing on the essential functions of each structure and device. Also, wherever possible, the same reference numbers will be used throughout the drawings to refer to the same or like parts.

A 3GPP LTE-A system (hereinafter referred to as an "LTE-A system") is required to support (1) reference signals for PDSCH demodulation, and (2) two different types of reference signals for checking channel status. In the following description, a reference signal for PDSCH demodulation may be referred to as a dedicated reference signal (abbreviated as "DRS") or a demodulation reference signal (abbreviated as "DMRS"), as the user-specific reference signal. Also, a reference signal may also be referred to as a reference signal (RS) or as a pilot, depending upon the applied standard. The above-described DRS or DMRS is mostly used for demodulation and may be divided into pre-coded RS and non-precoded RS. Furthermore, the present invention proposes that, in an MIMO system, the DRS or DMRS are to be set, so as to be transmitted to a single user receiving multiple layer signals in a single user-multi input multi output mode (SU-MIMO mode), or to be transmitted to multiple users in a multi user-multi input multi output mode (MU-MIMO mode).

Figure 4:
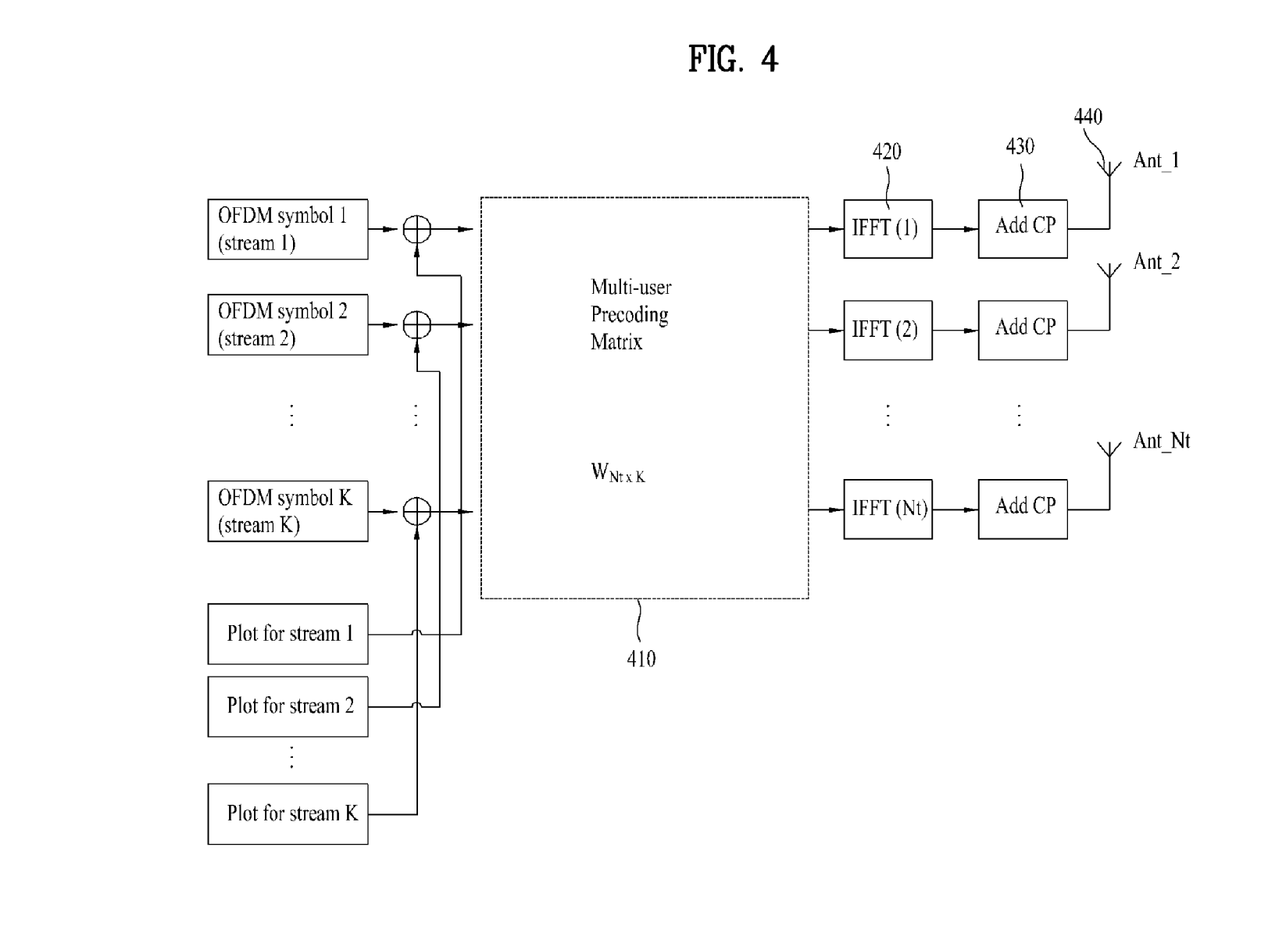
FIG. 4 illustrates a general view of an exemplary transmitter structure through which a precoded RS is transmitted using an MU-MIMO method.

FIG. 4 illustrates a general view of an exemplary transmitter structure through which a pre-coded RS is transmitted using an MU-MIMO method. As shown in FIG. 4, K number of stream data are transmitted through OFDM symbol 1 to OFDM symbol K. Herein, a stream refers to a signal flow of a signal being transmitted through an independent path, and a number of streams corresponding to a number of layers being used for the transmission may be transmitted. Therefore, each stream signal may be referred to as a 'layer signal' or a 'layer'. Meanwhile, when K number of layers is transmitted, i.e., when K number of layers is used for the transmission, the transmitter according to the embodiment of the present invention may also transmit DMRS through K number of layers. Herein, K is always smaller than or equal to Nt (i.e., a number of physical antennae).

Meanwhile, it is preferable that identical precoding is performed on K number of data and K number of DMRS by a precoder 410. As shown in FIG. 4, when an MU-MIMO method is applied, the precoder 410 performing a precoding procedure by using a multi user precoding matrix. Thereafter, the K number of data and K number of DMRS precoded as described above respectively pass through an IFFT module 420 a cyclic prefix (CP) insertion module 430, thereby being transmitted to multiple UEs through Nt number of antennae 440. Referring to FIG. 4, the total K number of layers may be assigned (or allocated) to multiple UEs. At this point, 1 to K number of UEs may simultaneously share the same time/frequency resource. Alternatively, although FIG. 4 illustrates an example where the MU-MIMO method is applied, a transmitter structure for an SU-MIMO transmission method may be used without modification, when one UE for receiving signals through the antenna 440 is used, and when the precoder 410 uses a SU-MIMO-specific precoding matrix.

Alternatively, in the LTE-A system, as a means for supporting an 8Tx MIMO method, an 8Tx RS structure may be provided, and checker RS and DMRS are separately transmitted in order to reduce RS overhead. At this point, in case of the DMRS, by using a precoded RS so as to additionally reduce RS overhead, and by transmitting a checker RS to a low duty cycle, the RS structure may be optimized. Furthermore, it is preferable that the DMRS is set to exist only in a resource block and layer, wherein a downlink transmission is scheduled by the base station.

Hereinafter, a method for efficiently transmitting and receiving DMRS, when the system is operated in the MU-MIMO/SU-MIMO modes, and a method for reducing interference between multiple users of space, when the system is operated in the MU-MIMO mode, will be described in detail. Referring to FIG. 4, a multi-user precoding matrix $W_{Nt*K}$ represents a precoding matrix for configuring Nt number of physical transmission antennae and a space multiplexing rate K. More specifically, when transmission data is expressed as vector $\bar{s}_k = [s_1^k s_2^k \ldots s_K^k]^T$, by being processed with the following precoding procedure, the precoding vector transmitted to Nt number of physical transmission antennae may be configured as $\bar{x}_k = [x_1^k x_2^k \ldots x_{N_2}^k]^T$.

$$\bar{x}_k = W_{N_2 \times K} \cdot \bar{s}_k \quad \text{Equation 1}$$

$$W_{N_t \times K} = (\bar{w}_1, \bar{w}_2, \ldots, \bar{w}_K) = \underbrace{\begin{pmatrix} w_{10} & w_{20} & \cdots & w_{K0} \\ w_{11} & w_{21} & \cdots & w_{K1} \\ \vdots & \vdots & \ddots & \vdots \\ w_{1N_t} & w_{2N_t} & \cdots & w_{KN_t} \end{pmatrix}}_{\text{Multi-user precoding matrix}}$$

Herein, k represents a time-frequency resource index. Also, in Equation 1, $\bar{W}_i$ signifies the $i^{th}$ column vector of matrix $W_{N \times K}$. In Equation 1, K number of column vectors may be created by reconfiguring the information fed-back from each of the 1 to K number of UEs. Alternatively, the base station may also arbitrarily configure the K number of column vectors by using the channel information fed-back from the UE. At this point, the precoded RS may be configured in the following format.

A. RS Spatial Multiplexing

An RS spatial multiplexing method allows spatial separation (or spatial division) to be performed by a precoding vector, as reference signals (RSs) for K number of layers are transmitted to the same time-frequency region. Equation 2 below shows a method for configuring the RS spatial multiplexing method.

$$R_m = W_{N_2 \times K} \bar{r}_m, \quad \bar{r}_m = [r_1^m(1), r_1^m(2), \ldots, r_1^m(K)]^T \quad \text{Equation 2}$$

As shown in Equation 2, $\bar{r}_m$ represents an $m^{th}$ RS symbol vector of an RS sequence. And, $[\cdot]^T$ signifies a transpose of a matrix/vector. Furthermore, $r_j^m(n)$ represents a $j^{th}$ virtual antenna port of an $m^{th}$ RS symbol for an $n^{th}$ layer. The virtual antenna refers to an antenna that can transmit orthogonal RSs. Being in an orthogonal formation, the reference signals may be differentiated. Herein, when it is assumed that the RSs for each virtual antenna are configured to be orthogonal, the K number of virtual antennae $r_j^m$, m, j=1, ..., K may be configured to be differentiated (or identified) within the time/frequency/code regions. Therefore, Equation 2 shows a transmission method enabling reference signals of the same time/frequency/code regions to be spatially multiplexed, thereby being identified by the precoding vector $\bar{w}_i$, i=1, ..., K.

According to an embodiment of the present invention, when reference signals are transmitted by using a specific number of layers (i.e., N number of layers), the RSs being transmitted through each layer are multiplexed in specific time-frequency regions by using a code division multiplexing (CDM) method. And, when the number of layers used for RS transmission is greater than N (e.g., when the number of layers is equal to M, wherein M>N), N number of RSs is multiplexed by using the CDM method within each of the specific time-frequency regions and the additional time-frequency regions. Furthermore, RSs may be additionally multiplexed by using time-division multiplexing (TDM) or frequency division multiplexing (FDM) between the time-frequency regions, so as to transmit DMRS.

Figure 5:
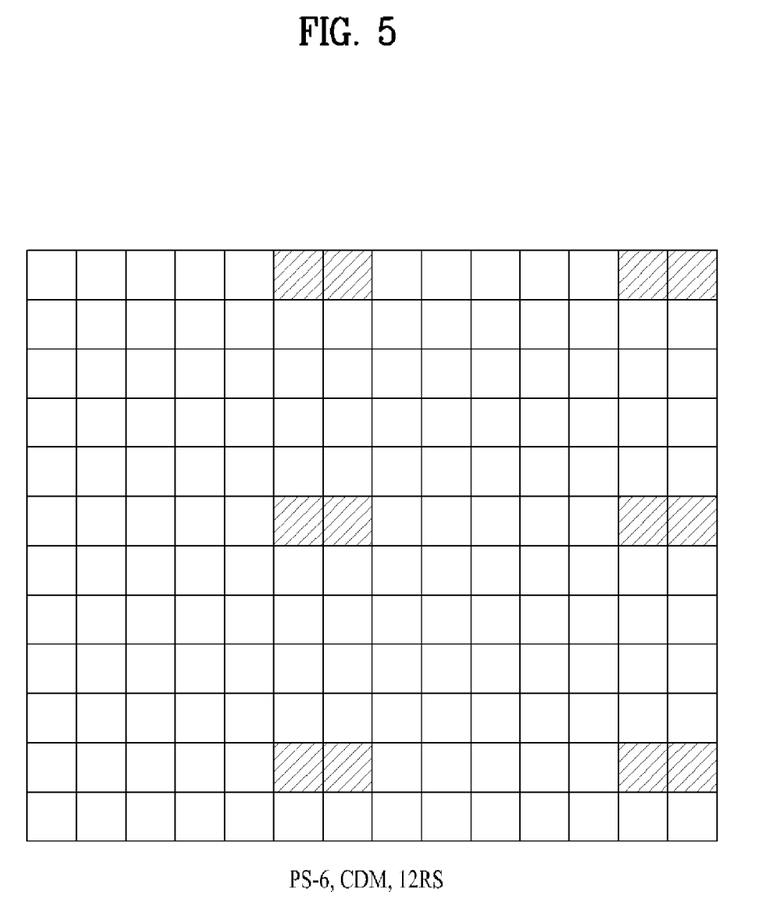
FIG. 5 illustrates a structure for transmitting a DMRS according to an embodiment of the present invention.

FIG. 5 illustrates a structure for transmitting a DMRS according to an embodiment of the present invention. FIG. 5 shows a general sub-frame using a general (or normal) cyclic prefix. Referring to FIG. 5, the horizontal axis represents the time region, and the vertical axis represents the frequency region. Also, in the time-frequency regions shown in FIG. 5, the smallest squared region corresponds to 1 OFDM symbol in the time region and to 1 subcarrier in the frequency region.

Referring to FIG. 5, the pattern marked in light-green represents a pattern for transmitting DMRS. More specifically, when the DMRS is transmitted through two layers, FIG. 5 illustrates a pattern transmitting two DMRSs processed with CDM through 12 resource elements. In case the DMRS is transmitted through 4 layers or through 8 layers, additional resource elements may be used in order to additionally multiplex the DMRS using TDM and FDM. Also, in case the system uses the MU-MIMO mode, it is preferable that each UE signals its DMRS region to the other UEs in order to prevent the DMRS transmitted to a specific UE from colliding with data of another UE.

Meanwhile, using Equation 2 shown above, a preferred embodiment of the present invention proposes a method for configuring an RS of a specific position so that the RS can have a greater power, thereby enabling a specific UE to perform better in channel reception. For example, RS is configured so that the RS of layer 1 transmits signal with a greater power that of the RS of layer 2, as shown in $|r_1^m(1)|^2 > |r_1^m(2)|^2$. In case of the UE, in order to perform demodulation, the UE may receive a signal when given an RS power-to signal power ratio. Equation 3 shown below specifies an exemplary RS/signal power ratio.

$$\alpha_i [\text{dB}] = 10 \log_{10} \frac{|r_1(i)|^2}{|s_i|^2}, i = 1, 2, \ldots, K \quad \text{Equation 3}$$

In order to be able to receive data, the UE should know the $\alpha_i$ [dB] of Equation 3. Therefore, according to the embodiment of the present invention, when a high transmission power is to be used for an RS of a specific position, it is preferable that settings are made so that the corresponding information can be notified to each UE through PDCCH or RRC signaling in sub-frame units or predetermined time units. When RS is transmitted by using the above-described method, K number of UEs respectively uses $w_i$, i=1, ..., K so as to receive an RS. Herein, the corresponding UE can only view its own channel. In this case, since each UE receives one layer at the most, in the MU-MIMO mode, the maximum number of layers that can belong to one UE may be configured so as to decide the number of orthogonal RSs used herein, by using Equation 4 shown below.

$$R_m = W_{N_2 \times K} \bar{r}_m \bar{r}_m = [r_1^m(1), r_2^m(2), \ldots, r_1^m(K)]^T \quad \text{Equation 4}$$

In Equation 4, when it is assumed that $r_1^m(1)$, $r_2^m(2)$ is assigned to one UE, multiple layers may be transmitted to a single UE. At this point, configuration may also be made so that $|r_1^m(1)|^2 > |r_2^m(2)|^2$. In this case, $\alpha_1$, $\alpha_2$ for each layer should be transmitted to a single UE. More specifically, when multiple layers are assigned to a single UE, a number of orthogonal RSs corresponding to the number of layers should be configured. And, when it is assumed that the RS power for each layer may be determined differently, the single UE should be informed of the RS layer for each layer.

Similarly, the power of a data layer may also be differently configured for each layer. The associated information may be provided by using delta power. When using delta power of a $\alpha_1$, $\Delta(\alpha_1 - \alpha_2)$ format, the overhead of a control signal may be additionally reduced. Meanwhile, in case the DMRS is transmitted by using multiple layers as described above, a method for transmitting a downlink control signal for supporting both MU-MIMO/SU-MIMO modes will now be described in detail.

1. RS Spatial Multiplexing

In case of a system supporting two layers, an orthogonal RS may be identified by $r_1^m(1)$, $r_2^m(2)$. In order to receive the first layer, the respective channel information should be obtained by using $r_1^m(1)$. And, in order to receive the second layer, the respective channel information should be obtained by using $r_2^m(2)$. Herein, in case of the MU-MIMO mode, which simultaneously transmits data to multiple UEs, a specific UE (or UE group) may be configured to use $r_1^m(1)$ so as to receive data, and another UE (or UE group) may be configured to use $r_2^m(2)$ so as to receive data. At this point, $r_1^m(1)$, $r_2^m(2)$ is configured so that the mutually orthogonal characteristic can be satisfied in the time, frequency, or code region. In the above-described configuration, the system may be classified into two different types.

Type-1 (Implicit SU-MIMO/MU-MIMO Mode Support)

This embodiment of the present invention proposes the usage of an identical downlink control signal format regardless of whether the SU-MIMO mode or the MU-MIMO mode is applied to the system. This method relates to a method of configuring the system so that the SU-MIMO mode and the MU-MIMO mode are identical for the UE. In other words, regardless of the application of the SU-MIMO mode or the MU-MIMO mode, the same feedback method and receiving method are applied to the UE. In this case, a control signal having the format as shown in able 1 below may be used in the downlink control signal.

TABLE 1

| Index | Information |
|---|---|
| 00 | Rank-1 $r_1^m$ (1) |
| 01 | Rank-1 $r_2^m$ (2) |
| 10 | Rank-2 {$r_1^m$ (1) -$1^{st}$ layer, $r_2^m$ (2) -$2^{nd}$ layer} |
| 11 | Reserved |

The reserved field in Table 1 may be additionally used for indicating the usage or non-usage of a specific MIMO method (e.g., layer shifting, layer permutation, layer swapping, etc.) of rank-2. Table 2 below shows an exemplary method of using the above-described reserved field.

TABLE 2

| Index | Information |
|---|---|
| 00 | Rank-1 $r_1^m$ (1) |
| 01 | Rank-1 $r_2^m$ (2) |
| 10 | Rank-2 {$r_1^m$ (1) -$1^{st}$ layer, $r_2^m$ (2) -$2^{nd}$ layer} |
| 11 | Rank-2 {$r_2^m$ (2) -$1^{st}$ layer, $r_1^m$ (1) -$2^{nd}$ layer} |

More specifically, in the embodiment of the present invention, layer-specific information used for transmission only via a specific rank to each UE may be signaled. In case the transmission does not correspond to the specific rank, settings may be made so that the transmission can be performed through a pre-decided layer. The downlink control signal according to the present invention may also have a format other than those shown in Table 1 and Table 2. However, information on the number of ranks being assigned to each UE and information on the RS belonging to which layer is to be used for the UE using one rank are required to be transmitted. In case rank-2 is used, information on the order for the two layers may be indicated as shown in Table 2.

Type-2 (Explicit SU-MIMO/MU-MIMO Mode Support)

This embodiment of the present invention proposes a method of explicitly determining a separate downlink control signal format for the SU-MIMO mode and the MU-MIMO mode. For example, the downlink control signal format for the SU-MIMO mode and the downlink control signal format for the MU-MIMO mode may have the following formats.

TABLE 3

| Index | Information |
|---|---|
| 0 | Rank-1 $r_1^m$ (1) |
| 1 | Rank-2 {$r_1^m$ (1) -$1^{st}$ layer, $r_2^m$ (2) -$2^{nd}$ layer} |

TABLE 4

| Index | Information |
|---|---|
| 0 | Rank-1 $r_1^m$ (1) |
| 1 | Rank-1 $r_2^m$ (2) |

Table 3 shows an exemplary downlink control signal format for the SU-MIMO mode, and Table 4 shows an exemplary downlink control signal format for the MU-MIMO mode. In the embodiment of the present invention, when using the MU-MIMO mode, as shown in Table 4, the downlink control signal format may be configured so that only rank-1 can be supported. Accordingly, the downlink control signal format may be configured and used to indicate the corresponding orthogonal RS using a 1-bit index, which corresponds to the same format as that of the SU-MIMO mode.

Type-3 (Implicit SU-MIMO/MU-MIMO Mode Support Using Multiple Sequences)

When an orthogonal RS is configured in a CDM method, although two layers are being used, the orthogonal RS may be configured by using two or more sequences. In this case, configuration may be made so that the RS for a larger number of UEs can be transmitted simultaneously. Therefore, when rank-1 is used for transmission, one orthogonal RS among {$r_1^m(1), r_2^m(2), \ldots, r_n^m(N)$} is notified, and when rank-1 is used for transmission, two orthogonal RSs among {$r_1^m(1), r_2^m(2), \ldots, r_n^m(N)$} are notified.

TABLE 5

| Index | Information |
|---|---|
| 000 | Rank-1 $r_1^m(1)$ |
| 001 | Rank-1 $r_2^m(2)$ |
| 010 | Rank-1 $r_3^m(3)$ |
| 011 | Rank-1 $r_4^m(4)$ |
| 100 | Rank-2 $\{r_1^m(1)$ -$1^{st}$ layer, $r_2^m(2)$ -$2^{nd}$ layer$\}$ |
| 010 | Rank-2 $\{r_1^m(1)$ -$1^{st}$ layer, $r_3^m(3)$ -$2^{nd}$ layer$\}$ |
| 011 | Rank-2 $\{r_2^m(2)$ -$1^{st}$ layer, $r_3^m(3)$ -$2^{nd}$ layer$\}$ |
| 111 | Rank-2 $\{r_2^m(2)$ -$1^{st}$ layer, $r_4^m(4)$ -$2^{nd}$ layer$\}$ |

Although Table 5 is configured of 8 different examples, Table 5 may also be configured so as to show all combinations or to partially configure and use subsets. In the whole (or entire) set, the subset may be configured in a cell-specific format, a UE-specific format, or a fixed format. In the above-described embodiment of the present invention, it is assumed that up to two layers are used for transmitting the DMRS. However, a larger number of layers may be used for transmitting the DMRS. Furthermore, the downlink control signal transmission format may be decided by using the same principles as those used in the above-described embodiment of the present invention.

Type-4 (Explicit SU-MIMO/MU-MIMO Mode Support Using Universal Downlink Control Signaling)

This embodiment of the present invention proposes a method of simultaneously supporting the SU-MIMO/MU-MIMO modes by using a single universal downlink control signal. In this case, it is preferable to notify the UE whether the corresponding downlink control signal is configured for the SU-MIMO mode or for the MU-MIMO mode. This information may be indicated through CRC masking or may be indicated by adding 1 bit to the downlink control signal. At this point, information of the rank of the downlink control signal may be set to be interpreted differently depending upon the SU-MIMO mode and the MU-MIMO mode.

TABLE 6

| Index | Information |
|---|---|
| 0 | Rank-1 transmission |
| 1 | Rank-2 transmission |

TABLE 7

| Index | Information |
|---|---|
| 0 | Rank-1: $r_1^m(1)$ is used for signal demodulation, and other RS is used for other UE |
| 1 | Rank-1: $r_2^m(2)$ is used for signal demodulation, and other RS is used for other UE |

Table 6 shows an example of interpreting rank information in the SU-MIMO mode, and Table 7 shows an example of interpreting rank information in the MU-MIMO mode.

2. RS Time/Frequency Multiplexing

This embodiment of the present invention proposes a method of always transmitting K number of orthogonal RSs regardless of the number of UEs to which each RS is simultaneously transmitted, when using the DMRS. This may be expressed by using Equation 5 shown below.

$$R_m = W_{N_2 \times K} \bar{r}_m, \quad \bar{r}_m = [r_1^m(1), r_2^m(2), \ldots, r_K^m(K)]^T \quad \text{Equation 5}$$

When transmission is performed as shown in Equation 5, all UEs always receive the channel of all layers. Therefore, information indicating which layer corresponds to the RS of the corresponding UE should be notified. In this case, the RS information may be notified by using two different methods. One of the methods is to indicate which of the K number of layer is the layer for the corresponding UE by using a bit map or a specific method, or to indicate only the used RS information. The other method relates to when the number K is unknown to the UE. In this case, a method of receiving the RS without knowing the number K (i.e., how many layers are used) may be provided. For example, among K number of layers, when it is assumed that a specific UE is to receive layer 1 and layer 2, the base station provides the UE with information indicating that $r_1^m(1)$, $r_2^m(2)$ have been used. Then, based upon this information, the UE may receive the corresponding RS.

The first method is advantageous in that the UE is capable of controlling to a certain level an interference signal originating from another UE signal. However, since the UE should be capable of performing channel checking for all layers, the RS overhead may be large. The second method may be able to reduce RS overhead by transmitting a signal of the corresponding UE to a position where an orthogonal RS is transmitted for another UE. However, the second method is disadvantageous in that multi-user interference cannot be controlled in the corresponding UE. In this case, the RS power may be determined differently for each later, as described above. And, such information $\alpha_i$ [dB] may be transmitted through the PDCCH or the RRC, or may be transmitted in accordance with a specific time cycle period.

3. MU-MIMO-Based Antenna Selection Using Virtualization

The LTE-A system is configured to support 8 different transmission antennae. However, in order to also support an LTE UE, which supports up to 4 transmission antennae, antenna virtualization may be determined and used herein. More specifically, antenna virtualization refers to a method of configuring 8 initial virtual antennae and transmitting RS for 4 of the 8 virtual antennae in order to perform a 4Tx MIMO transmission. $c_i(m)$, $i=0, \ldots, 7$ corresponds to a cell-specific RS sequence respective to antenna #0 to antenna #7, which are used for checking (or measuring). By using the virtual antenna matrix (V), $c_i(m)$, $i=0, \ldots, 7$ may be mapped to the virtual antenna. Herein, $C_i(m)$, $i=0, \ldots, 7$ represents a virtual-antenna-mapped RS sequence.

$$C_i(m) = \bar{v}_i \cdot c_i(m), \quad i = 0, 1, \ldots, 7 \quad \text{Equation 6}$$

$$V = (\bar{v}_0, \bar{v}_2, \ldots, \bar{v}_7) = \underbrace{\begin{pmatrix} v_{00} & v_{10} & \cdots & v_{70} \\ v_{01} & v_{11} & \cdots & v_{70} \\ \vdots & \vdots & \ddots & \vdots \\ v_{07} & v_{17} & \cdots & v_{77} \end{pmatrix}}_{\text{virtualization matrix}}$$

Herein, as a complex coefficient, $v_{ij}$ may be configured in a variety of formats depending upon the current circumstances. It s preferable that the V matrix is generally configured in a unitary matrix format, so that all transmission antennae can transmit an equal power level. For example, the virtual antenna matrix (V) may be configured to have the format shown in Equation 7 below.

Equation 7

$$V_{example1} = (\bar{v}_0, \bar{v}_2, \ldots, \bar{v}_7) = \begin{pmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \end{pmatrix}$$

Equation 8

$$V_{example2} = (\bar{v}_0, \bar{v}_2, \ldots, \bar{v}_7) =$$

$$\begin{pmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ e^{j\theta_1 n} & 0 & 0 & 0 & -e^{j\theta_1 n} & 0 & 0 & 0 \\ 0 & e^{j\theta_2 n} & 0 & 0 & 0 & -e^{j\theta_2 n} & 0 & 0 \\ 0 & 0 & e^{j\theta_3 n} & 0 & 0 & 0 & -e^{j\theta_3 n} & 0 \\ 0 & 0 & 0 & e^{j\theta_4 n} & 0 & 0 & 0 & -e^{j\theta_4 n} \end{pmatrix}$$

Alternatively, the virtual antenna matrix (V) may also be configured in the form of well known matrices, such as the DFT matrix or the Walsh matrix. More specifically, based upon the 8 virtual antennae configured as described above, the MU-MIMO may be configured without additionally using the precoding matrix. In this case, the UE may configure an accurate CQI, thereby minimizing complexity in the UE. For example, the UE may estimate 8 virtual antennae through the cell-specific RS used for checking purposes (CRS) $C_i(m)$, so as to estimate the channel of all 8 transmission antennae. Therefore, among the CRS $C_i(m)$ for the 8 transmission antennae, when a transmission antenna besting fitting the UE is selected, this indicates that the $\bar{v}_i$ of the virtualization matrix is selected. In other words, this corresponds to a method of selecting one specific transmission antenna among 8 different transmission antennae. And, when the related information is fed-back, the base station may be able to induce the $\bar{v}_i$ in accordance with the fed-back information. The base station may use the transmission antenna selection information fed-back from multiple UEs, so as to induce a precoding vector $\bar{v}_i$ preferred by each UE. Then, based upon the induced vector, the base station configures an arbitrary precoding vector, so as to transmit the MU-MIMO. At this point, the newly configured (or created) precoding vector may be transmitted through the DMRS.

Furthermore, in order to efficiently configure MU-MIMO pairing, among the total of 8 transmission antennae $C_i(m)$, i=0, 1, . . . , 7, a subset is configured so that the selected antenna information, CQI, and so on are only fed-back and used in the subset. The performance of this method may be decided based upon the configuration of the virtualization matrix. Herein, the base station may also arbitrarily decide and use the virtualization matrix configuration. For example, although the UE receives all of $C_i(m)$, i=0, 1, . . . , 7, when the base station determines a subset as $\{C_1, C_2, C_4\}$, it is preferable that the UE feeds-back the information related to the MU-MIMO only within the corresponding subset. This method may be used in combination with an additional precoding vector/matrix. For example, when a rank-a precoding vector set is configured, as shown in Equation 9 below, and used, the additional precoding vector and the virtual antenna may both be selected.

Equation 9

$$Set_1^{rank1} =$$

$$\{\bar{p}_0, \bar{p}_1, \bar{p}_2, \ldots, \bar{p}_N\} = \left\{ \begin{bmatrix} 1 \\ 0 \\ 0 \\ 0 \\ 0 \\ 0 \\ 0 \\ 0 \end{bmatrix}, \begin{bmatrix} 0 \\ 1 \\ 0 \\ 0 \\ 0 \\ 0 \\ 0 \\ 0 \end{bmatrix}, \begin{bmatrix} 0 \\ 0 \\ 1 \\ 0 \\ 0 \\ 0 \\ 0 \\ 0 \end{bmatrix}, \ldots, \begin{bmatrix} 1 \\ 1 \\ 1 \\ 1 \\ -1 \\ j \\ -j \\ 1 \end{bmatrix} \right\}$$

In Equation 9, $\bar{p}_0, \bar{p}_1, \bar{p}_2$ represents a portion of a virtual antenna selection vector, this may be used in combination with a non-virtual antenna selection vector, such as $\bar{p}_N$. Herein, N signifies the size of a codebook subset and is always smaller than or equal to the total codebook size. This may be easily expanded in the MU-MIMO mode, wherein multiple layers are assigned to a single UE.

4. Rank Selection

When the system uses the MU-MIMO mode, wherein multiple layers are assigned to a single UE, the UE cannot easily feed-back the number of preferred layers to the base station. This is because it is difficult for the UE to estimate the number of scheduled UEs and the amount (or level) of multi-user interference. Therefore, in the MU-MIMO mode, the UE should use the number of layers decided by the base station.

Therefore, although multiple layers are used, a rank feedback is not required in the MU-MIMO. Such rank selection may be performed by using a codebook subset restriction. Herein, the codebook subset restriction should be configured differently for the SU-MIMO mode and the MU-MIMO mode. For example, as shown in Table 8 below, it is assumed that a SU-MIMO codebook having 16 precoding vectors/matrices for each rank of 4 transmission antennae is used. In this case, the total number of precoding vectors/matrices in Table 8 is equal to 64. In a basic method of restricting codebook subset in a SU-MIMO mode, each precoding vector/matrix is configured to be turned on/off by using a 64-bit bitmap.

Accordingly, even if the codebook subset is used, all ranks may be included in the subset, or only the precoding of a specific rank may be used. However, in case of the MU-MIMO mode, since there is no rank feedback, the codebook subset restriction should always be configured in rank units. For example, when it is assumed that the SU-MIMO codebook shown below is used without modification, 2 bits are used to specify the rank. Then, the remaining 16-bit bitmap may be used to turn on/off the subset of the corresponding rank. However, since a full rank transmission signifies the SU-MIMO mode, not all of the ranks used in the SU-MIMO mode are required to be used. For example, when the precoding of the MU-MIO mode is predetermined to use only rank-1 and rank-2, the rank information for the codebook subset is configured of 1 bit, and the codebook subset may be configured of the remaining 16 bits.

TABLE 8

| Codebook index | $u_n$ | Number of layers v (rank) | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 8 shown above, $W_n^{\{s\}}$ may be obtained by a set {s} being configured of the following equation $W_n = I - 2u_n u_n^H / u_n^H u_n$. At this point, I represents an identity matrix, and $u_n$ is given in Table 8. Such precoding may be configured in any format, and a specific codebook format may be configured for 8 transmission antennae. However, the format of the above-described codebook subset may be directly applied without modification. Additionally, even though the system uses the MU-MIMO mode, in order to know the channel status of the UE belonging to the base station more accurately, the system may require rank, PMI, CQI feedback of the SU-MIMO mode format.

Figure 6:
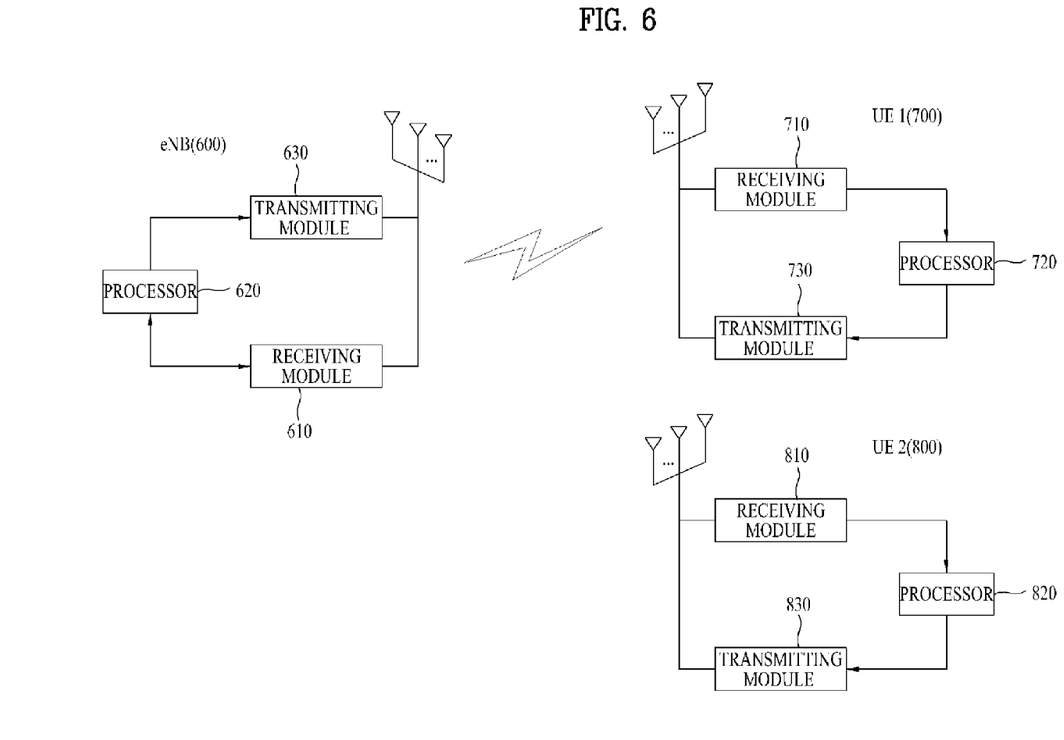
FIG. 6 illustrates a general view showing a system configuration according to an embodiment of the present invention.

FIG. 6 illustrates a general view showing a system configuration according to an embodiment of the present invention. It is assumed that the base station 600 used in the embodiment of the present invention corresponds to a base station using two or more layers so as to transmit DMRS. Herein, the base station 600 includes Nt number of transmission and reception antennae. The base station 600 also includes a receiving module 610 for receiving uplink signals, a processor 620 for processing the receiving signals and providing the transmitting signals, and a transmitting module 630 for transmitting downlink signals. The processor 620 of the base station 600 may include processing modules, as shown in FIG. 2, for transmitting downlink signals. However, this will not limit the detailed structure of the processor 620 performing the functions that will now be described in detail.

In the description of the present invention, it is proposed that the processor 620 of the base station 600 uses each of the two or more layer so as to perform PDSCH demodulation, thereby multiplexing and transmitting two or more DMRSs that are to be transmitted using the CDM method. As described above, the CDM-processed two or more layers may be transmitted in the MU-MIMO mode so as to be transmitted to different UEs 700 and 800. Alternatively, the CDM-processed two or more layers may be transmitted in the SU-MIMO mode so that all of the multiple layers are used for a single UE (e.g., 700).

Additionally, the processor 620 of the base station 600 may provide downlink control signals indicating the DMRS transmission format to each UE 700 and/or 800. Herein, the downlink control signals provided by the processor 620 of the base station 600 may use all of the above-described type 1 to type 4. For example, when the same control signal format is used regardless of the MU-MIMO/SU-MIMO mode, a downlink control signal may include information on the number of layers being assigned to each UE, layer identification information assigned to each UE, and so on. Meanwhile, the UE 700 and/or 800 receiving the DMRS being transmitted from the base station 600 through two or more layers may include receiving modules 710 and 810 for receiving downlink signals, processors 720 and 820 processing downlink receiving signals and providing uplink transmitting signals, and transmitting modules 730 and 830 transmitting uplink signals.

More specifically, the receiving modules 710 and 810 of the UE may receive DMRS, which is multiplexed by using a CDM method in a predetermined time-frequency region for downlink data signal demodulation, and downlink control signals indicating the downlink transmission method for each UE from the base station 600. Herein, the downlink control signals may be set to have the same format regardless of whether or not the DMRS, which is multiplexed by using the CDM method in a predetermined time-frequency region, includes downlink reference signals that are transmitted to the corresponding UE (e.g., 700) as well as other UEs (e.g., 800). As described above, depending upon the information of the downlink control signals received by the receiving modules 710 and 810, the processors 720 and 820 may each be able to process the received DMRS.

As described above, the technique for receiving and transmitting downlink reference signals has the following advantages. According to the embodiment of the present invention, by using downlink reference signals being transmitted through two or more layers, the present invention may efficiently support a single-user transmission mode/multi-user transmission mode. Furthermore, the present invention may minimize signaling overhead and may also minimize interference between each user. Herein, although the description of the present invention has been focused on the 3GPP LTE-A system, the present invention may be applied to IEEE-type systems, which correspond to the next generation mobile telecommunications technology, or may be applied to system of other standards under the same principles described herein.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting downlink signals to a user equipment (UE) at a base station (BS) in a multiple input multiple output (MIMO) wireless communication system, the method comprising:
transmitting a downlink control channel and a downlink data channel to the UE,
wherein, when the downlink data channel comprises one transmission layer, one demodulation reference signal is transmitted to the UE and the downlink control channel includes information indicating which antenna port is used for transmitting the one demodulation reference signal among a plurality of antenna ports, and
wherein, when the downlink data channel comprises two or more transmission layers, two or more demodulation reference signals are transmitted to the UE on two or more fixed antenna ports among the plurality of antenna ports, respectively.

2. The method of claim 1, wherein the downlink data channel, the one demodulation reference signal and the two or more demodulation reference signals are processed according to a same precoding procedure.

3. The method of claim 1, wherein:
when the downlink data channel comprises the one transmission layer, the downlink data channel is transmitted on the indicated antenna port, and
when the downlink data channel comprises the two or more transmission layers, the downlink data channel is transmitted on the two or more fixed antenna ports.

4. A method of receiving downlink signals from a base station (BS) at a user equipment (UE) in a multiple input multiple output (MIMO) wireless communication system, the method comprising:
receiving a downlink control channel and a downlink data channel from the BS,
wherein, when the downlink data channel comprises one transmission layer, one demodulation reference signal is received from the BS and the downlink control channel includes information indicating which antenna port is used for receiving the one demodulation reference signal among a plurality of antenna ports, and
wherein, when the downlink data channel comprises two or more transmission layers, two or more demodulation reference signals are received from the BS on two or more fixed antenna ports among the plurality of antenna ports, respectively.

5. The method of claim 4, wherein the downlink data channel, the one demodulation reference signal and the two or more demodulation reference signals are processed according to a same precoding procedure by the BS.

6. The method of claim 4, wherein:
when the downlink data channel comprises the one transmission layer, the downlink data channel is received on the indicated antenna port, and
when the downlink data channel comprises the two or more transmission layers, the downlink data channel is received on the two or more fixed antenna ports.

7. A base station (BS) in a multiple input multiple output (MIMO) wireless communication system, the BS comprising:
a processor for generating a downlink control channel and a downlink data channel; and
a transmitter for transmitting the downlink control channel and the downlink data channel to a user equipment (UE),
wherein, when the downlink data channel comprises one transmission layer, one demodulation reference signal is transmitted to the UE and the downlink control channel includes information indicating which antenna port is used for transmitting the one demodulation reference signal among a plurality of antenna ports, and
wherein, when the downlink data channel comprises two or more transmission layers, two or more demodulation reference signals are transmitted to the UE on two or more fixed antenna ports among the plurality of antenna ports, respectively.

8. The BS of claim 7, wherein the processor processes the downlink data channel, the one demodulation reference signal and the two or more demodulation reference signals according to a same precoding procedure.

9. The BS of claim 7, wherein:
when the downlink data channel comprises the one transmission layer, the downlink data channel is transmitted on the indicated antenna port, and
when the downlink data channel comprises the two or more transmission layers, the downlink data channel is transmitted on the two or more fixed antenna ports.

10. A user equipment (UE) in a multiple input multiple output (MIMO) wireless communication system, the UE comprising:
a receiver for receiving a downlink control channel and a downlink data channel from a base station (BS); and
a processor for processing the downlink control channel and the downlink data channel,
wherein, when the downlink data channel comprises one transmission layer, one demodulation reference signal is received from the BS and the downlink control channel includes information indicating which antenna port is used for receiving the one demodulation reference signal among a plurality of antenna ports, and
wherein, when the downlink data channel comprises two or more transmission layers, two or more demodulation reference signals are received from the BS on two or more fixed antenna ports among the plurality of antenna ports, respectively.

11. The UE of claim 10, wherein the downlink data channel, the one demodulation reference signal and the two or more demodulation reference signals are processed according to a same precoding procedure by the BS.

12. The UE of claim 10, wherein:
when the downlink data channel comprises the one transmission layer, the downlink data channel is received on the indicated antenna port, and
when the downlink data channel comprises the two or more transmission layers, the downlink data channel is received on the two or more fixed antenna ports.

* * * * *